Patented Mar. 1, 1949

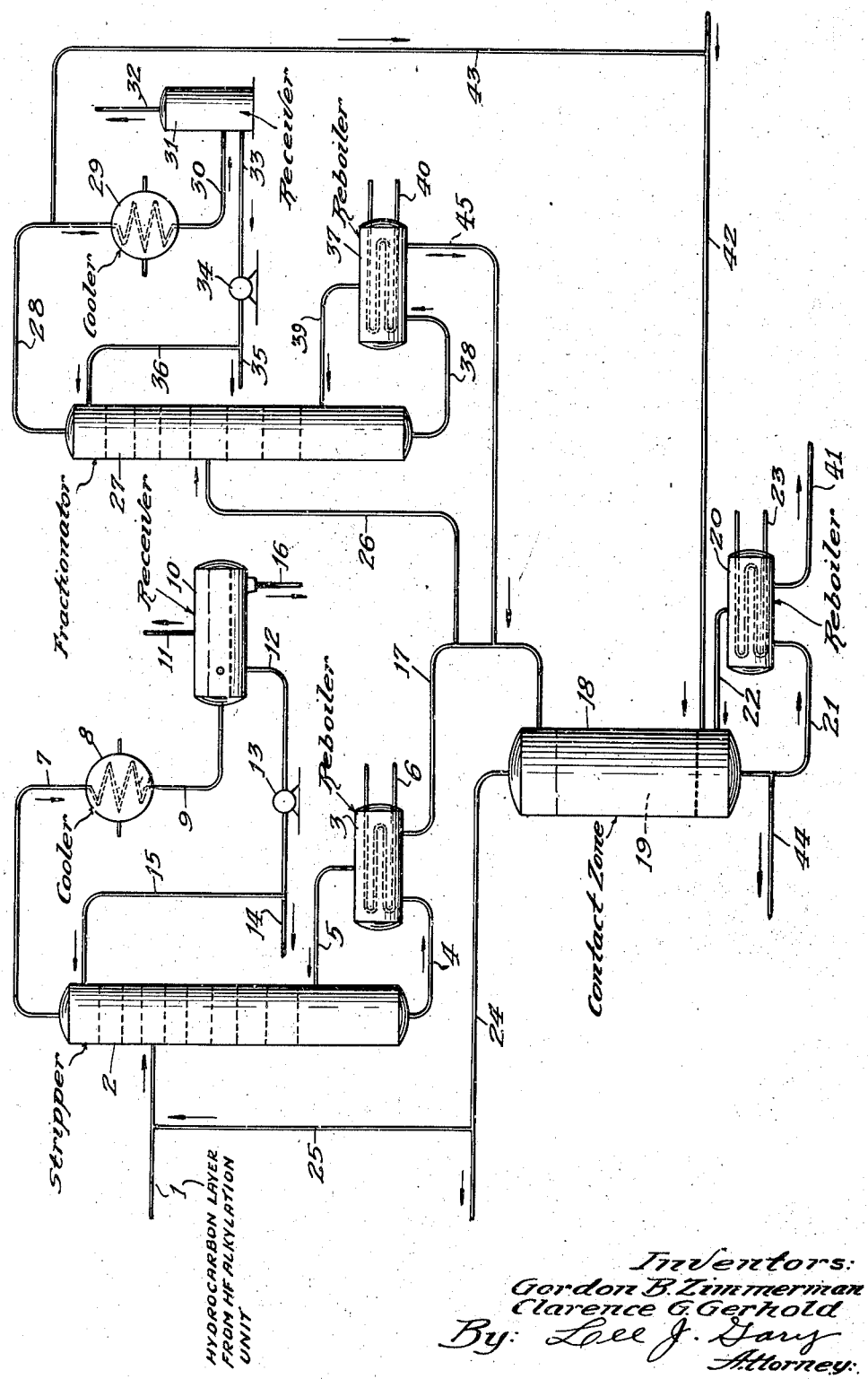

2,463,077

UNITED STATES PATENT OFFICE 2,463,077

PROCESS FOR TREATING HYDROCARBON MIXTURES TO REMOVE HALOGENS THEREFROM

Gordon B. Zimmerman and Clarence G. Gerhold, Chicago, Ill., assignors to Universal Oil Products Company, Chicago, Ill., a corporation of Delaware Application August 30, 1943, Serial No. 500,540

11 Claims. (Cl. 260—683.4)

This invention relates to a process for treating hydrocarbon mixtures to remove halogens therefrom. More particularly it relates to the treatment of synthetic hydrocarbons produced with active halide catalysts to remove the small amounts of dissolved hydrogen halide and of organically combined halogen which are present as an impurity in the hydrocarbon products recovered from the synthesis process. The invention is particularly adapted to the treatment of hydrocarbons produced by the alkylation of isoparaffins with olefins using active fluoride catalyst including hydrogen fluoride or hydrofluoric acid, and mixtures comprising essentially hydrogen fluoride and boron fluoride.

The alkylation of branched chain paraffins such as isobutane, isopentane, etc., with olefins, such as propylene, butylene, amylene, etc., to produce liquid hydrocarbons which are of great value as gasoline motor fuels because of their high antiknock properties has now assumed commercial importance. Active fluoride catalysts as heretofore mentioned are utilized in effecting the alkylation reaction, but it has been found that the resultant alkylation product frequently contains minor quantities of fluorine, both as dissolved hydrogen fluoride and as fluorine in combination with the hydrocarbons, the latter possibly being due to the interaction of hydrogen fluoride with the olefinic constituents of the reaction mixture under the influence of the catalyst.

Although the fluorine content of the alkylate is rarely very high, its presence is undesirable. It has been found that the presence of fluorine in alkylates is definitely objectionable because of its corrosive character, its tendency to readily react with various substances with which it comes into contact and thereby to form undesirable products which may result in plugging of the apparatus, and to its detrimental effect on the antiknock properties of the alkylate particularly when tetraethyl lead is added thereto. Not only is the removal of fluorine from the hydrocarbons important for the above reasons, but also the decomposition of the combined fluorine compounds is important because the combined fluorine represents a loss of hydrogen fluoride.

In the alkylation process, after the reactants have been contacted with the catalyst, and the reaction has proceeded to the desired extent, the products are separated into a catalyst layer and a hydrocarbon layer. Due to the solubility of hydrogen fluoride in the hydrocarbons, the hydrocarbon layer will contain some dissolved hydrogen fluoride and will also contain organically combined fluoride compounds, such as alkyl fluorides. It is an object of the present invention to provide an improved process for the removal of both the dissolved hydrogen fluoride and the organically combined fluorine compounds.

In addition to the treatment of normally liquid hydrocarbon mixtures containing combined fluorine, the present invention is also applicable to the treatment of normally gaseous hydrocarbon fractions containing combined fluorine and dissolved hydrogen fluoride.

In a broad aspect the present invention relates to a process for treating a hydrocarbon mixture containing dissolved hydrogen halide and an organic halogen compound to remove the halogen therefrom, which comprises fractionating the mixture to remove at least a portion of the dissolved hydrogen halide, and contact the remaining mixture containing hydrocarbon and organic halogen compound with a dehydrohalogenating agent under conditions to separate at least a portion of the halogen from the hydrocarbon.

In one specific embodiment the present invention comprises a process for purifying an alkylation product formed in the presence of an active fluoride catalyst and containing dissolved hydrogen fluoride and a relatively small amount of an organically combined fluorine compound, which comprises stripping said alkylation product in a fractionating zone to remove a major portion of the dissolved hydrogen fluoride, treating the remaining mixture containing hydrocarbon and organically combined fluorine compound in a separate contact zone with a dehydrofluorinating agent under conditions to decompose said organically combined fluorine compound into hydrogen fluorine and hydrocarbon, and fractionating the overhead products liberated in said contact zone in said fractionating zone.

While the present invention is directed particularly to the removal of fluorine from hydrocarbon mixtures, it is applicable to the removal of the other halogens, including chlorine, bromine and iodine, but not necessarily under the same conditions of operation or not necessarily with equivalent results.

Any suitable dehydrofluorinating agent may be used within the scope of the present invention and thus may include such dehydrofluorinating agents as metals, such as aluminum, iron, lead, etc. which preferably are in porous condition; metal oxides such as alumina which may be substantially pure or which may comprise aluminous minerals such as bauxite; metal salts and particularly the fluorides, such as aluminum fluoride, calcium fluoride, etc. which likewise are preferably in porous condition. These agents may be dispersed on suitable carriers.

It is understood that the above dehydrofluorinating agents are not necessarily equivalent in their action. In fact, experiments have shown that some of the above agents will react with the liberated hydrogen fluoride at least during the initial portion of the treating cycle. It is therefore preferred to use agents, such as aluminum, which act more like a catalyst to decompose the organically combined fluorine into hydrogen fluoride and thus to release the hydrogen fluoride for recycling to the alkylation reaction zone for further use therein. Some of the above reagents, such as calcium fluoride, appear to react with hydrogen fluoride during the initial stages of the treatment but do release hydrogen fluoride during the later stages of the treatment. In certain cases, however, it may be satisfactory to utilize the other types of reagents which react with the hydrogen fluoride and subsequently to recover the fluorine from the reagent by suitable purging, stripping, or other means.

The advantages of the present process, as briefly hereinbefore set forth and as will be described hereinafter in detail, include the following. The decomposition of an organically combined fluorine compound into hydrogen fluoride and a hydrocarbon is an equilibrium reaction. In the first step of the process of the present invention, the dissolved hydrogen fluoride is removed from the alkylate to leave an alkylate substantially free of hydrogen fluoride. The alkylate is then treated in the second step of the process to decompose the organically combined fluorine compound into hydrogen fluoride and because of the substantial absence of hydrogen fluoride in the alkylate introduced to the second step, the equilibrium therein will be shifted towards the production of additional hydrogen fluoride and hydrocarbon, and thus the decomposition reaction in the contact zone is enhanced. Another advantage to the present process is that, by effecting the removal of the dissolved and the combined fluorine compounds in separate zones, each of these zones may be independently controlled as to conditions of operation in order to obtain best results for each individual treatment.

Still another advantage to the present process is that the treated alkylate from the first step of the process may be subjected to treatment in the second step of the process without further heating. Thus, the heat introduced in the first step of the process to strip the dissolved hydrogen fluoride will leave the alkylate at a sufficiently high temperature so that it may be treated in the second step of the process without the necessity of additionally heating the same.

As a particular feature of the present invention, the hydrogen fluoride liberated by decomposition of the organically combined fluorine compound is stripped from the dehydrohalogenating agent by introducing a regulated portion of a vapor or gas, either introduced from an extraneous source or recovered from within the system or, when desired, the bottoms product in the contact zone may be vaporized by means of a reboiler or other suitable heating medium in order to furnish vapors for stripping the hydrogen fluoride from the dehydrofluorinating agent. As heretofore mentioned, the amount of fluorine as organically combined fluorine is small and thus there will be only a very minor portion of resulting hydrogen fluoride to be so stripped from the dehydrofluorinating agent. Therefore, the amount of vapors or gases so required will be small.

In another embodiment of the invention, the alkylate, after removal of dissolved hydrogen fluoride, may be subjected to further fractionation treatment in order to remove low boiling hydrocarbons, such as isobutane or mixtures of isobutane and normal butane together with whatever other normally gaseous hydrocarbons, if any, which may be entrained or dissolved in the alkylate. The advantages of this operation are two-fold, as applied to the alkylation of an isoparaffin and particularly isobutane with an olefin in the presence of hydrogen fluoride catalysts, the first advantage is that the isobutane is separated from the alkylate and may be recycled to the alkylation treatment for further conversion therein. If any hydrogen fluoride is carried over with the isobutane fraction, its presence is not harmful and, in fact, is desirable since the hydrogen fluoride would then be returned to the alkylation treatment wherein it may be used as the catalyst. The second advantage to this operation is that the amount of material being supplied to the contact zone is reduced, with the concomitant reduction in the size and cost of the treating tower and the reduction in the amount and cost of the dehydrofluorinating agent required.

The invention will be more fully described in connection with the accompanying diagrammatic drawing which illustrates several embodiments of the invention. In the interest of simplicity, the following description will be directed to the treatment of an alkylate containing dissolved hydrogen fluoride and organically combined fluorine compounds, although it is understood that the broad scope of the invention is not limited thereto.

Referring to the drawing, the charging stock is introduced at the desired temperature and pressure, from a source and by suitable means not shown, through line 1 into stripper 2. Stripper 2 may comprise any suitable apparatus for effecting the desired fractionation and, in the case here illustrated, comprises a conventional fractionating column which may contain any suitable fractionating means such as baffle plates, bubble trays, side-to-side pans, etc. Zone 2 is preferably equipped with suitable cooling means in the upper portion thereof and with suitable heating means in the lower portion thereof.

In the case here illustrated, reboiler 3 is in communication with zone 2 by means of supply line 4 and return line 5. The reboiler may be equipped with any suitable heating means such as closed coil 6. It is understood that an internal reboiler disposed within the lower portion of zone 2 or any other suitable heating means may be employed.

The temperature and pressure conditions maintained in zone 2 are so regulated to effect stripping at least a portion of the dissolved hydrogen fluoride from the alkylate. The exact conditions to be employed will depend upon the characteristics of the particular charging stock being treated. When the charging stock comprises an alkylate produced by the alkylation of isobutane with a normally gaseous olefin, superatmospheric pressures up to 500 pounds or more per square inch and preferably within the range of from about 150 to about 350 pounds per square inch are generally employed. In general, the temperature maintained in the lower portion of the stripper is within the range of from about 150° to about 400° F., and preferably within the range of from about 200° to about 300° F.

The lighter products withdrawn as an overhead stream from zone 2 will comprise hydrogen fluoride and possibly some normally gaseous hydrocarbons such as propane and butane. The overhead products may be passed through line 7, cooler 8 and line 9 to receiver 10. Receiver 10 is operated under sufficient pressure to condense an acid layer and a hydrocarbon layer and at the same time to release any lighter hydrocarbons through vent line 11. The hydrocarbon layer may be withdrawn from receiver 10 through line 12 and may be supplied to pump 13 by means of which it may be withdrawn from the process through line 14 but preferably at least a portion thereof is returned by way of line 15 to the upper portion of zone 2 to act as a cooling and refluxing medium therein. Hydrogen fluoride may be withdrawn from receiver 10 through line 16 and preferably is recycled to the alkylation process by well known means not illustrated.

The alkylate which now is considerably reduced in, if not substantially free from, dissolved hydrogen fluoride, is withdrawn from reboiler 3 through line 17 and, in one embodiment of the invention it is directed into contact zone 18. Zone 18 may comprise one or a plurality of zones containing a suitable dehydrofluorinating agent illustrated diagrammatically by numeral 19. When the dehydrofluorinating agent is more of a catalytic character, it usually will be satisfactory to employ only one of such treating zones. On the other hand, if the dehydrofluorinating agent is more of the reagent type which reacts at least in part with the hydrogen fluoride, preferably at least two such zones are employed so that one may be in service while the reagent in the other zone may either be subjected to regeneration or removed from the treating zone and replaced by fresh treating agent.

As a particular feature of the invention, the temperature and pressure conditions employed in zone 18 will be substantially the same as those utilized in stripper 2. It is readily apparent that this advantage is quite important from a practical consideration since it eliminates the necessity of providing additional means for heating or additional means for increasing the pressure. The alkylate will thus be introduced through line 17 into zone 18 at a temperature which preferably is within the range of from about 200° to about 300° F. and at a pressure within the range of from about 150 to about 350 pounds per square inch. Under these conditions and in the presence of dehydrofluorinating agent 19, the organically combined fluorine compounds will be decomposed into hydrogen halide and hydrocarbon.

Reboiler 20, having supply line 21, return line 22 and heating means such as closed coil 23, is provided for vaporizing the alkylate in zone 19 and to strip the hydrogen fluoride released by said decomposition. As heretofore mentioned, the amount of heat required to be introduced into reboiler 20 will be very small since only enough vapor is required to strip the hydrogen fluoride liberated in contact zone 18 from dehydrofluorinating agent 19. As an alternative, but not necessarily equivalent method, a heated extraneous vapor or gas may be directed through line 42 and introduced into the lower portion of zone 18 in order to effect the necessary stripping therein. One particularly suitable method for accomplishing the stripping is to utilize a portion of the overhead vapors from fractionator 27 by supplying the same from line 28 through lines 43 and 42 into the lower portion of zone 18. In this method of operation, reboiler 20 may be omitted and the dehydrofluorinated alkylate may be withdrawn from the system through lines 21 and 44.

The overhead products from zone 18 which will contain hydrogen fluoride and hydrocarbon may be removed from zone 18 through line 24 and may be withdrawn from the process. Since the hydrocarbon formed by the decomposition of the combined fluorine compound will be an olefin, and since the overhead fraction from zone 18 will also contain hydrogen fluoride, the overhead product in line 24 may advantageously be supplied, by suitable means not illustrated, to the alkylation process for further conversion therein. In a preferred embodiment of the invention, the overhead products from zone 18 may be directed by way of lines 24, 25 and 1 to stripper 2 for further treatment therein in admixture with the charging stock introduced through line 1. The dehydrofluorinated alkylate is withdrawn from reboiler 20 through line 41.

In another embodiment of the invention, the alkylate withdrawn from reboiler 3 may be directed through lines 17 and 26 into fractionator 27. Fractionator 27 may be similar to or different than heretofore described stripper 2, but its exact design will depend upon the particular operation to be employed. Fractionator 27 will usually contain suitable fractionating means such as bubble trays, baffle plates, side-to-side pans, etc. In the preferred embodiment of the invention, fractionator 27 preferably comprises a deisobutanizer; that is, a fractionator for separating isobutane from the other constituents. In this embodiment of the invention the temperatures employed will likewise depend upon the characteristics of the particular charging stock introduced to the process, but in general the pressure will be superatmospheric up to 500 pounds or more and preferably within the range of from about 50 to 200 pounds per square inch and the temperature will likewise be within the range of from about 100° to about 400° F. and preferably within the range of from about 200° to about 300° F.

An isobutane fraction will be withdrawn as an overhead stream from fractionator 27 through line 28, cooler 29, line 30 and will be directed into receiver 31, which will be maintained at sufficient temperature and pressure to separate a liquid isobutane fraction from lighter gases, the latter being removed through vent line 32. The condensate in receiver 31 is withdrawn therefrom through line 33 to pump 34 by means of which it is directed through line 35 and may be removed from the process, but preferably at least a portion thereof is directed by way of line 36 to the upper portion of fractionator 27 to serve as a cooling and refluxing medium therein. The isobutane fraction in line 35 may advantageously be supplied, by well known means not illustrated, to the alkylation process for further treatment therein. Fractionator 27 is likewise equipped with suitable heating means in the lower portion thereof, such as reboiler 37, having supply line 38, return line 39 and suitable heating means such as closed coil 40, in order to effect the desired fractionation in zone 27. The alkylate, which is now free from dissolved hydrogen fluoride and isobutane, may be withdrawn from reboiler 37 through line 45 and may be supplied through line 17 to contact zone 18. Here again the alkylate being withdrawn through line 39 will be of suitable temperature and pressure for conversion in contact zone 18.

In another embodiment of the invention, fractionator 27 may comprise a stabilizer, debutanizer, depentanizer, etc. This will depend upon the exact composition of the alkylate desired as the final product. In one embodiment of the invention, zone 27 may comprise two fractionating columns, the first one being utilized to effect separation of isobutane and the second one being utilized to effect separation of normal butane from the normally liquid alkylation product. The normal butane may be utilized in any suitable manner, such as being subjected to dehydrogenation to produce butene which may be supplied to the alkylation process. It is apparent that these alternative operations are comprised within the broad scope of the present invention, but that the results obtained thereby are not necessarily equivalent.

In the interest of simplifying the drawing, valves and other similar appurtenances are not shown since the drawing is intended primarily as diagrammatic.

Although the preferred embodiment of the invention is, as heretofore set forth, to effect the dehydrofluorination treatment under substantially the same temperature and pressure conditions prevailing in the lower portion of the preceding fractionator, in certain cases and with certain catalysts it may be desirable to effect the dehydrofluorination under higher temperatures and/or pressures. In this case, a pump and/or heater may be interdisposed between the reboiler of the preceding fractionator and contact zone 18.

The following example is introduced for the purpose of further illustrating the novelty and utility of the present invention, but not with the intention of unduly limiting the same.

Isobutane may be alkylated with butene in the presence of hydrogen fluoride catalyst at a temperature of about 100° F. A hydrocarbon layer may be separated from the catalyst layer and the hydrocarbon layer may then be introduced into stripping zone 2 which may be operated at a pressure of 200 pounds per square inch, a bottom temperature of 235° F. and a top temperature of 120° F. The reboiled alkylate may be supplied through line 17 to contact zone 18, containing a bed of porous aluminum metal, and maintained at a temperature of about 230° F. and a pressure of about 195 pounds per square inch. The overhead product from contact zone 18 may be directed through line 24 into stripping zone 2 for fractionation therein in commingled state with the charging stock introduced in line 1. The dehydrofluorinated alkylate may be removed from reboiler 23 through line 41.

The alkylate, prior to introduction into stripping zone 2, may have a fluorine content of about 0.0251, while the fluorine content of the final alkylate withdrawn through line 41 may be about 0.0007.

We claim as our invention:

1. A two-stage process for treating a mixture of a hydrocarbon, dissolved hydrogen fluoride and an organically combined fluorine compound to reduce the fluorine content of said mixture, which comprises fractionating said mixture in a first stage to remove at least a portion of the dissolved hydrogen fluoride, removing the remaining hydrocarbon and organically combined fluorine compound in admixture from the first stage and treating the same in a second stage independent of said first stage with a dehydrofluorinating agent under dehydrofluorinating conditions to decompose at least a portion of said organically combined fluorine compound into hydrogen fluoride and hydrocarbon, and fractionating in said first stage vaporous products liberated in said second stage to thereby separate the hydrogen fluoride formed by said decomposition in commingled state with said dissolved hydrogen fluoride.

2. In the purification of a hydrocarbon mixture synthesized in the presence of an active fluoride catalyst and containing dissolved hydrogen fluoride and a relatively small amount of an organically combined fluorine compound as an impurity therein, the improvement which comprises fractionating said hydrocarbon mixture in a fractionating zone to remove at least a portion of the dissolved hydrogen fluoride, withdrawing the remaining hydrocarbon and organically combined fluorine compound in admixture from said fractionating zone and treating the same in a contact zone independent of said fractionating zone with a dehydrofluorinating agent under dehydrofluorinating conditions to decompose at least a portion of said organically combined fluorine compound into hydrogen fluoride and hydrocarbon, removing the last-named hydrogen fluoride and hydrocarbon in vaporous form from the contact zone and introducing the same to said fractionating zone.

3. In the purification of an alkylation product formed in the presence of hydrogen fluoride and containing dissolved hydrogen fluoride and a relatively small amount of an organically combined fluorine compound as an impurity therein, the improvement which comprises fractionating said alkylation product in a fractionating zone to remove at least a portion of the dissolved hydrogen fluoride, withdrawing the remaining alkylation product containing an organically combined fluorine compound from said fractionating zone and treating the same in a contact zone independent of said fractionating zone with a dehydrofluorinating agent under dehydrofluorinating conditions to decompose at least a portion of said organically combined fluorine compound into hydrogen fluoride and hydrocarbon, removing the last-named hydrogen fluoride and hydrocarbon in vaporous form from the contact zone and introducing the same to said fractionating zone.

4. The process of claim 3 further characterized in that said remaining alkylation product is subjected to further fractionation in order to remove at least a portion of the normally gaseous hydrocarbons from the alkylation product prior to treatment of the latter in said contact zone.

5. The process of claim 3 further characterized in that said remaining alkylation product is subjected to further fractionation in order to remove isobutane from the alkylation product prior to treatment of the latter in said contact zone.

6. The process of claim 3 further characterized in that said remaining alkylation product is subjected to further fractionation in order to remove isobutane from the alkylation product prior to treatment of the latter in said contact zone and in that a regulated portion of said removed isobutane is contacted in vaporous state with said dehydrofluorinating agent in order to strip the hydrogen fluoride formed by said decomposition from the dehydrofluorinating agent.

7. A process for treating a hydrocarbon mixture containing dissolved hydrogen halide and an organic halogen compound, which comprises fractionating said mixture in a fractionating zone maintained at a temperature sufficient to liberate dissolved hydrogen halide from the mixture, removing unvaporized hydrocarbons containing said organic halogen compound from the fractionating zone and introducing the same, while still hot, to a second zone maintained at a temperature at least as high as the fractionating zone, contacting the hydrocarbons in said second zone with a dehydrohalogenating agent at a temperature sufficient to decompose said organic halogen compound into hydrogen halide and hydrocarbon, removing the last-named hydrogen halide and hydrocarbon in vaporous form from said second zone and introducing the same to said fractionating zone for fractionation therein together with said mixture, removing hydrogen halide vapors from the fractionating zone, and removing purified hydrocarbon liquid from said second zone.

8. A process for treating a hydrocarbon mixture containing dissolved hydrogen fluoride and an organic fluorine compound, which comprises fractionating said mixture in a fractionating zone maintained at a temperature sufficient to liberate dissolved hydrogen fluoride from the mixture, removing unvaporized hydrocarbons containing said organic fluorine compound from the fractionating zone and introducing the same, while still hot, to a second zone maintained at a temperature at least as high as the fractionating zone, contacting hydrocarbons in said second zone with a dehydrofluorinating agent at a temperature sufficient to decompose said organic fluorine compound into hydrogen fluoride and hydrocarbon, removing the last-named hydrogen fluoride and hydrocarbon in vaporous form from said second zone and introducing the same to said fractionating zone for fractionation therein together with said mixture, removing hydrogen fluoride vapors from the fractionating zone, and removing purified hydrocarbon liquid from said second zone.

9. The process as defined in claim 8 further characterized in that a low boiling hydrocarbon component of said mixture is separated from the latter prior to the introduction of said unvaporized hydrocarbons to the second zone and at least a portion of said component introduced to the lower portion of the second zone as a stripping medium for hydrogen fluoride therein.

10. In the alkylation of isobutane in the presence of hydrogen fluoride catalyst wherein there is formed a hydrocarbon liquid containing isobutane, dissolved hydrogen fluoride and an organic fluorine compound, the method which comprises fractionating said liquid to separate dissolved hydrogen fluoride and isobutane therefrom, separately withdrawing from the fractionating operation a hydrogen fluoride fraction, an isobutane fraction and the unvaporized portion of said liquid containing the organic fluorine compound, contacting said withdrawn unvaporized portion in a contacting zone with a dehydrofluorinating agent at a temperature sufficient to decompose the organic fluorine compound into hydrogen fluoride and hydrocarbon, introducing at least a portion of said isobutane fraction to the contacting zone as a stripping medium for hydrogen fluoride therein, supplying hydrogen fluoride-containing vapors from the contacting zone to said fractionating operation, and removing purified hydrocarbon liquid from the contacting zone.

11. In the catalytic alkylation of hydrocarbons in the presence of hydrogen fluoride, wherein there is produced a hydrocarbon alkylate containing relatively small amounts of dissolved hydrogen fluoride and organic fluorine compounds, the method of purifying said alkylate which comprises fractionating the same in a fractionating zone maintained at a temperature sufficient to liberate dissolved hydrogen fluoride as vapor from the alkylate, removing from the lower portion of said zone a liquid bottoms product substantially free of dissolved hydrogen fluoride and containing the organic fluorine compounds, introducing at least a portion of said bottoms product, without intentional cooling thereof, to a second zone containing a solid dehydrofluorinating agent and therein contacting the same with said agent at a temperature sufficient to decompose the organic fluorine compounds into hydrogen fluoride and hydrocarbon, removing the last-named hydrogen fluoride and hydrocarbon in vaporous form from said second zone and introducing the same to said fractionating zone at a point above the bottom thereof for fractionation therein together with said alkylate, and removing hydrogen fluoride vapors from the upper portion of the fractionating zone.

GORDON B. ZIMMERMAN.
CLARENCE G. GERHOLD.

REFERENCES CITED

The following references are of record in the file of this patent:

UNITED STATES PATENTS

| Number | Name | Date |
| --- | --- | --- |
| 1,869,781 | Shiffler et al. | Aug. 2, 1932 |
| 1,934,068 | Jolly | Nov. 7, 1933 |
| 2,164,334 | Marks | July 4, 1939 |
| 2,267,730 | Grosse et al. | Dec. 30, 1941 |
| 2,317,901 | Frey | Apr. 27, 1943 |
| 2,320,629 | Matuszak | June 1, 1943 |
| 2,333,648 | Grosse et al. | Nov. 9, 1943 |
| 2,333,649 | Grosse et al. | Nov. 9, 1943 |
| 2,347,945 | Frey | May 2, 1944 |